United States Patent Office 3,464,494
Patented Sept. 2, 1969

3,464,494
METHOD OF PLUGGING EARTH FORMATIONS WITH FLUORIDE CATALYZED SILICIC ACID CHEMICAL GROUT
Homer C. McLaughlin, Duncan, Okla., assignor to Halliburton Company, Duncan, Okla., a corporation of Delaware
Continuation-in-part of application Ser. No. 574,676, Aug. 24, 1966. This application July 7, 1967, Ser. No. 660,541
Int. Cl. E21b 33/13; C09j 1/02
U.S. Cl. 166—292  10 Claims

ABSTRACT OF THE DISCLOSURE

This patent describes the method and composition for plugging or sealing subterranean earth formations using a silicic acid solution having its gel time controlled by the fluoride ion concentration.

---

This application is a continuation-in-part of my copending application Ser. No. 574,676 filed Aug. 24, 1966, now abandoned.

BACKGROUND OF THE INVENTION

Various types of materials have been used in oil wells to seal geological formations therein. Portland cement is one of the more common sealing agents used in oil wells. Some degree of success has been achieved using portland cement; however, there are numerous applications when such cement is ineffective. In sealing a formation, a technique known as "squeeze cementing" is normally used. In performing squeeze cementing, the slurry of portland cement is placed opposite the formation to be sealed and sufficient hydraulic pressure is applied to force the slurry into the formation. As the channels in the formation to be sealed are usually fine capillaries, they are too small to accept cement particles. The hydraulic pressure applied thus causes the formation to "break down" or fracture. When the split or opening of the formation under pressure, a sheet of portland cement slurry fills the crack formed and the capillary system of the formation is left essentially intact and unplugged.

Other materials such as plasters, pitches, swelling gruels, grain, etc., fail to seal formation capillaries, in a manner similar to portland cement. Emulsions are rarely successful because of their inherent resistance to flow in capillaries caused by the "Jamin effect."

The material used as a sealing agent must be a true fluid which is capable of entry and flow in capillaries, and which upon solidification, plugs or seals the capillaries occupied. The true fluid can be either a pure liquid or a solution.

Sodium silicate is a true fluid which is capable of sealing geological formations, but has previously been used with little or no success. Some of these prior art methods of sealing or plugging with sodium silicate are disclosed in U.S. Patents Nos. 2,236,147, 2,198,120 and 2,330,145.

Sodium silicate is a complicated system of various molecular weight silica polymers in an alkaline solution. Aside from requiring a certain minimum amount of alkalinity, sodium silicate has no definite chemical combining numbers. When sodium silicate is acidified to a pH less than about 10 or 11, the sodium silicate is converted largely to silicic acid. Silicic acid exists at these alkaline pH's as it is such a weak acid. Silicic acid is unstable and tends to split out water and polymerize to silica, examples of which are quartz, glass and sand. Instead of precipitating and making silica, $SiO_2$, the silicic acid remains hydrated and forms a three dimensional network is trapping the solvent water. This network is a gel since both phases are continuous.

A method of utilizing a silicic acid composition to seal underground formations or plug capillaries employing a silicic acid having a pH of 1.5 or less is described in McLaughlin et al. application, Ser. No. 511,141 filed Dec. 2, 1965 and entitled Method of Plugging or Sealing Formations, the disclosure of which is hereby incorporated by reference. Application Ser. No. 511,141 discloses that many of the disadvantages of the prior art methods of chemical grouting with sodium silicate can be obviated by using sodium silicate at a pH of 1.5 or less. At a pH of about 3.5, increasing the acidity will increase the gel time. However, at a pH in the vicinity of about 1 to about 2, there is a sharp peak in the gel time—acid concentration curve and with a pH lower than that at this maximum peak, the gel time decreases with increasing acid concentration.

Some of the advantages of using a silicic acid preparation having a pH of 1.5 or less are: insensitivity to brine contact; low viscosity; no premature plugging of capillary entryways; and effective gelation in the presence of carbonate formations such as limestone and dolomite.

However, certain applications employing sodium silicate require extremely rapid gelation times. Thus, chemical grouting to consolidate geological formations, e.g., around a dam or a building foundation under water, must be accomplished extremely rapidly because the rapid flow of water will tend to wash the grouting material away. The time demands are often not as severe in the case of thief zones in shallow wells, but nevertheless, a rapid gel time is also desirable in such a situation.

SUMMARY OF THE INVENTION

Briefly, the present invention comprises a method of accurately controlling the gel time of a silicic acid solution used for sealing subterranean earth formations by varying the concentration of fluoride ion in the solution.

It is an object of the present invention to provide a method for sealing subterranean earth formations employing a silicic acid solution.

It is a further object of the present invention to provide a method for obtaining a rapid and accurately controlled gel time for silicic acid sealing solutions.

These and other objects of the present invention will be more readily understood from the reading of the following specification and by reference to the accompanying drawings forming a part thereof.

DESCRIPTION OF PREFERRED EMBODIMENTS

Figure 1:
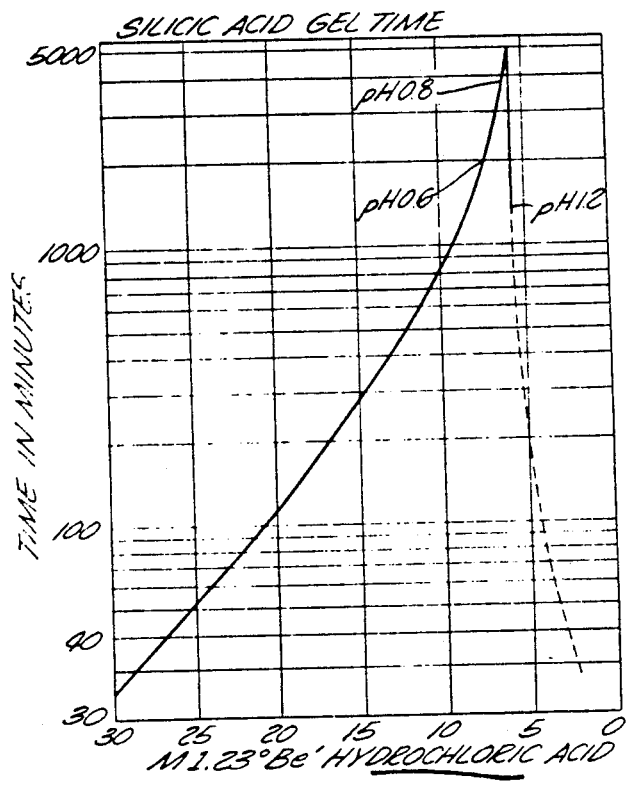
FIGURE 1 is a graph illustrating the relationship between gel time of silicic acid and pH.

FIGURE 1 is based upon a composition formed by mixing a solution containing 16.7 ml. 41° Bé. sodium silicate and 33.3 ml. water with a solution containing X ml. 23° Bé. HCl and 50-X ml. water. FIGURE 1 is specific for this composition only, the maximum varying between a pH of about 1 and 2 depending upon the type of acid, silicate concentration, $Na_2O:SiO_2$ ration etc. Thus, a pH of about 1.5 or less as used in this application, may include pH's of up to about 2 under some circumstances. Those skilled in the art can readily determine the pH at which the maximum point occurs for a specific solution which is being used.

It can be seen that in the area of pH 1 to about 3.5 the gel time varies rapidly with acid concentration and that there is a sharp break in the curve. Thus, it is extremely difficult to obtain a predetermined gel time with any degree of accuracy by variation of acid concentration in this range. A change from 6.5 ml. acid to 4 ml. acid changes the gel time from 3 days to 2 hours. With more than 6.5 ml. acid, it can be seen that a great excess of acid must be added in order to obtain a rapid gel time. Low gel times can be obtained by adding up to 20 ml. of 20° Bé. HCl per 100 ml. total mix or more but the ionic strength of such a solution is too high and syneresis is likely to be aggravated. Syneresis is a shrinkage of the gel accompanied by the exuding of fluid.

It is known that the fluoride ion will catalyze the gel time for a sodium silicate solution. However, it has now been discovered that the use of fluoride ion in a sodium silicate grouting solution not only catalyzes the gelling reaction, but also that the fluoride ion concentration can be varied and thus used to accurately control the gelation time of a sodium silicate solution.

Figure 2:
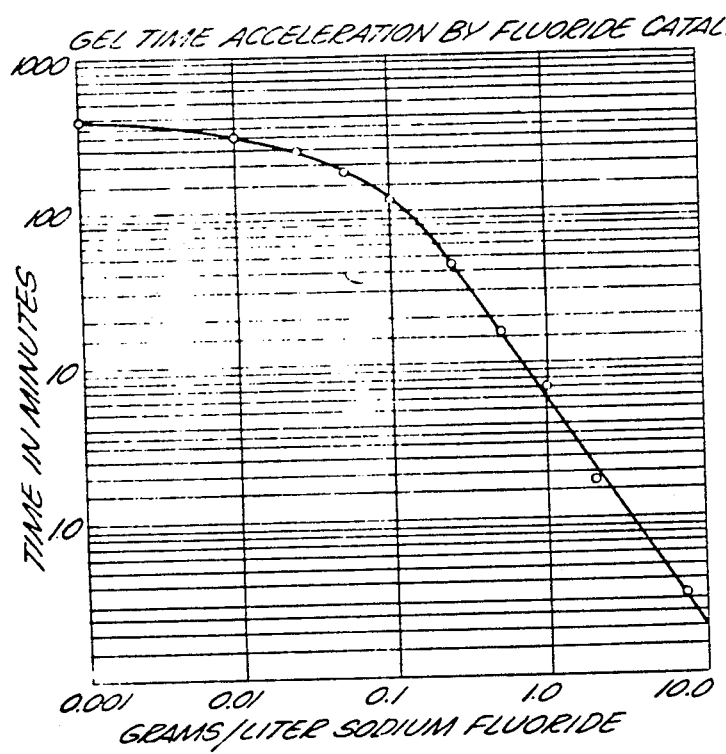
FIGURE 2 is a graph illustrating the relationship between gel time and fluoride ion concentration in a silicic acid solution.

FIGURE 2 illustrates the degree of control over gelation time which can be obtained by varying the fluoride ion concentration. The composition of the sodium silicate solution illustrated in FIGURE 2 corresponds with a solution of FIGURE 1 containing 12½ ml. hydrochloric acid with the exception that the solution of FIGURE 2 also contains fluoride ion added as sodium fluoride.

From FIGURE 1 it can be seen that the gel time for a solution containing 12½ ml. hydrochloric acid is 450 minutes. As would be expected, the gel time of the solution of FIGURE 2 is much shorter, being 120 minutes with a 0.1 gram per liter fluoride ion concentration and decreasing as fluoride ion concentration increases. However, it can be seen from FIGURE 2 that variation of the fluoride ion concentration can also be used to accurately control the gel time. The gentle slope of the curve of FIGURE 2, even with logarithmic changes in the catalyst concentration makes it possible for a commercial operator without a highly technical education to control the gel time reasonably without having to be extremely precise. Thus, referring to FIGURE 2, if the gel time is controlled by sodium fluoride concentration, a 10% difference in the sodium fluoride concentration at a cocentration of 1 gram per liter will result in only about a 1 minute difference in gel time.

In addition to the easy and accurate control of gel time provided by the present invention, it can be seen that very short gel times can be obtained. Furthermore, varying the gel time by adding small quantities of fluoride compounds such as sodium fluoride is much less expensive than adding large quanties of hydrochloric acid in order to obtain lower and controlled gel times. Also, changing the amount of hydrochloric acid present in the sodium silicate solution changes the characteristics of the solution and may result in a gel of inferior quality. Thus, according to the present invention, a solution can be prepared with the amount of acid that makes the highest quality gel with the least syneresis (shrinkage of the gel accompanied by the exuding of fluid); the gel times, especially short gel times being controlled by fluoride ion concentration rather than by the concentration of the hydrochloric acid which would change the characteristics of the fluid.

Any suitable sodium silicate solution may be used in the practice of this invention. Furthermore, other preparations with a pH of 1.5 or less which may be used in this invention are those containing alkaline cations such as potassium, guanidine, tetramethylammonium, etc. Potassium silicate is commercially available. Forty-one degree Bé., sodium silicate solution (e.g., Diamond Alkali Grade 40 or Pennsylvania Quartz N Brand) is preferred. However, other silicate solutions may be used without departing from the scope of the present invention.

Suitable acid solution for use in the present invention, in addition to the preferred hydrochloric acid, are other strong acids such as sulfuric, nitric, trichloroacetic, trinitrobenzoic, etc. The readily available 20° Bé., muriatic acid (hydrochloric) is preferred. Other hydrochloric acid solutions are usable. Any acid strong enough to maintain the pH of the silicic acid solution at 1.5 or less may used.

The silicic acid solution is normally prepared in two equal solutions, a sodium silicate solution and an acid solution. Other preparations can be used; however, it is essential that the sodium silicate be diluted with water to reduce viscosity before it is blended into the acid solution.

The silicic acid solution of the present invention must be carefully prepared. The sodium silicate at pH of 11.5 or more, for example, must be acidified to a pH of 1.5 or less. Any delay in the relatively neutral regions between pH 3 to pH 8 will result in irreversible premature gelation, as the gel time in these regions is only a few seconds. It is, therefore, essential that the pH be changed from 11.5 or more to pH of 1.5 or less as near instantly as possible.

With the small volumes used in laboratory procedures, this instant change of pH is accomplished with relative ease. The sodium silicate solution is always added to the acid so that it is always overwhelmed by the excess acid present. In the laboratory, this is accomplished by pouring the sodium silicate into the acid from a sufficient height to cause agitation.

In the preparation of a silicate acid solution having a pH of 1.5 or less, mixing is a critical operation and must be carried out with a skillful blend of mechanical and chemical knowledge. The sodium silicate must always be introduced into the acid, and the acid be in a sufficient amount to always overwhelm the sodium silicate.

Any suitable or convenient source of fluoride ion may be used. A very convenient source of flouride ion is sodium fluoride. However, other fluorides such as ammonium fluoride, ammonium bifluoride, ammonium fluorsulfonate, calcium fluorine, ferrous fluoride, ferric fluoride, potassium fluoride, etc. Also, if desired, the fluoride could be added as hydrofluoric acid or as hydrogen fluoride gas.

The sodium silicate grouting solutions of this invention have particular application to thief zones. Thief zones are characterized by the flow of fluids from a well bore into a geological formation. This is in contrast to water production in drilling and producing wells where the flow of fluids is into the well. Another characteristic of thief zones is that the flow is out of control and constitutes an undesirable drainage of the well bore. Thief zones commonly occur in drilling wells where the drilling mud is lost. They also occur in producing wells where oil production is lost. The presence of a thief zone may cause a particular problem in the case of secondary recovery water flood injection wells.

In secondary water flood recovery, water or some other fluid is introduced into a formation through one well bore so that the formation is flooded forcing oil out of a producing well. This method is well-known to those skilled in the art. If the injection well, the well into which water is introduced, contains a thief zone, a majority of the water may travel through the thief zone, thus resulting in a failure of sufficient pressure in other zones. To prevent this undue flow of water through the thief zone, the thief zone may be sealed with a sodium silicate grouting solutions. The method of introducing the silicic acid solution into the thief zone is described in copending application Ser. No. 511,141.

The fluoride gelation controller may be added to the sodium silicate solution as it is being mixed. However, in view of the rapid gel times obtained with the fluoride ion, it is usually desirable to add a water solution containing the fluoride ion just as the silicate solution is being introduced into the formation, etc. This may be conveniently accomplished by adding the fluoride ion solution to the silicate solution and mixing it immediately before it is introduced into its intended environment or by pumping a separate fluoride solution into the environment at about the same time as the silicate solution is being added.

Reference to the following examples may more readily explain the operation of the present invention.

Example 1

A grouting solution was required to stop a basement from leaking. It was determined that the best gel time was five minutes and that approximately ten liters of silicic acid would be required for injection into the ground over a one hour period. Two solutions were prepared having the following composition:

Solution A—1670 ml. 41° Bé. sodium silicate, 3330 ml. of water
Solution B—1250 ml. 23° Bé. HCl, 3750 ml. of water Solution A was added to Solution B over a 3-5 minute time period with good "whirlpool" type agitation. A one liter portion of the above mixture was drawn into a small container and 10 ml. of a 0.1 gram per ml. solution of sodium fluoride was added and stirred in. The mixture was displaced into the ground. Gelation occurred rapidly as was indicated by a substantial reduction in leaking.

Example 2

This example illustrates the extremely rapid and accurately determined gel times which are necessary for certain applications. The silicic acid was to be injected into a gravel wash formation which was under a dam. A gelation time of from only 20 seconds to 1 minute was required because of rapidly flowing water in the gravel wash. It was determined that 100 liters of low pH silicic acid solution would be required. Three solutions having the following composition were prepared:

Solution A—16.7 liters 41° Bé. sodium silicate, 33.3 liters water
Solution B—12.5 liters 23° Bé. HCl, 37.5 liters water
Solution C—1000 grams sodium fluoride, 9.65 liters water In introducing the silicate solution to the gravel wash, two pumps were used. Both pumps drew from small reservoirs which were replenished from the stock solution set forth above. One of the pumps pumped Solution A while the other pumped Solution B, the discharge of the pumps uniting in a small agitator box just prior to entering the gravel wash. The small reservoir for Solution A had a capacity of approximately 1 liter. Thus, upon filling the reservoir with Solution A, 150 ml. of Solution C was added. The small reservoirs were used so that the gel time could be changed at will after each 2 liter batch. The rapid formation of a gel in the gravel was was indicated by a solidification of the formation and a decreased flow of water.

Example 3

Example 2 was repeated using a 1 minute gel time by reducing the amount of Solution C added to 40 ml. Once again, there was an indication that gelation had occurred in the gravel wash.

The above examples are merely intended as illustrative of the invention and are not intended to be limiting. Thus, it can be seen by those skilled in the art that many variations both as to composition and method of mixing and incorporating the silicate solution can be made without departing from the scope of this invention. Therefore, the invention should be limited only by the lawful scope of the appended claims.

I claim:
1. A method of plugging or sealing earth formations and the like with a silicic acid solution whereby the gel time of the silicic acid can be predetermined, comprising establishing for a silicic acid solution, having a pH of about 1.5 or less, the variation of gel time with fluoride ion concentration, ascertaining the proper fluoride ion concentration for a desired gel time, introducing fluoride ions into said silicic acid so that said fluoride ion concentration is obtained, and introducing said fluoride ion containing silicic acid into said formation.

2. The method of claim 1 wherein the silicate is sodium silicate.

3. The method of claim 1 wherein the silicate is selected from the group consisting of sodium silicate, potassium silicate, guanidine silicate and tetramethylammonium silicate.

4. The method of claim 1 wherein the acid is hydrochloric.

5. The method of claim 1 wherein the acid is selected from the group consisting of hydrochloric, sulfuric, nitric, phosphoric, trichloroacetic, and trinitrobenzoic.

6. The method of claim 1 wherein the fluoride containing solution is a solution of sodium fluoride.

7. The method of claim 1 wherein the silicic acid and fluoride containing solution are mixed prior to introduction into the formation to be sealed.

8. The method of claim 7 wherein the fluoride ion containing solution is mixed with a silicate solution and the resulting solution is then mixed with an acid solution to form a silicic acid solution.

9. The method of claim 1 wherein the silicic acid and fluoride ion containing solution are mixed in the formation to be sealed.

10. The method of claim 1 wherein the silicate is sodium silicate.

References Cited
UNITED STATES PATENTS

| | | | |
|---|---|---|---|
| 2,195,586 | 4/1940 | Snell | 106—74 |
| 2,200,710 | 5/1940 | Bent et al. | 166—29 X |
| 2,281,810 | 5/1942 | Stone et al. | 166—29 X |
| 3,306,355 | 2/1967 | Maly | 166—38 X |
| 3,375,872 | 4/1968 | McLaughlin et al. | 166—29 |

CHARLES E. O'CONNELL, Primary Examiner
IAN A. CALVERT, Assistant Examiner

U.S. Cl. X.R.
106—74